United States Patent
Trisnadi et al.

(10) Patent No.: US 7,027,204 B2
(45) Date of Patent: Apr. 11, 2006

(54) HIGH-DENSITY SPATIAL LIGHT MODULATOR

(75) Inventors: Jahja I. Trisnadi, Cupertino, CA (US); Clinton B. Carlisle, Palo Alto, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 0 days.

(21) Appl. No.: 10/944,059

(22) Filed: Sep. 17, 2004

(65) Prior Publication Data

US 2005/0068609 A1    Mar. 31, 2005

Related U.S. Application Data

(60) Provisional application No. 60/506,624, filed on Sep. 26, 2003.

(51) Int. Cl.
G02B 26/00    (2006.01)
G02B 5/18     (2006.01)
G02F 1/03     (2006.01)

(52) U.S. Cl. ............... 359/291; 359/290; 359/572; 359/247

(58) Field of Classification Search ............... 359/290, 359/291, 295, 298, 197, 224, 231, 572, 247
See application file for complete search history.

(56) References Cited

U.S. PATENT DOCUMENTS 5,311,360 A * 5/1994 Bloom et al. ............... 359/572
6,215,579 B1   4/2001 Bloom et al.
6,856,449 B1 * 2/2005 Winkler et al. ............. 359/298
2005/0243403 A1 * 11/2005 Yun ........................... 359/291

OTHER PUBLICATIONS

D.T. Amm, et al. "Grating Light Valve Technology: Update and Novel Applications" May 19, 1998, pp. 1-4, Silicon Light Machines. Presented at Society for Information Display Symposium, Anaheim, CA.

David T. Amm, et al. "Optical Performance of the Grating Light Valve Technology" 1999, pp. 1-8, Silicon Light Machines, Sunnyvale, California.

R.W. Corrigan, "An Alternative Architecture for High Performance Display" Nov. 20, 1999, pp. 1-5, Silicon Light Machines. Presented at SMPTE Technical Conference and Exhibition, New York, NY.

(Continued)

*Primary Examiner*—Ricky L. Mack
*Assistant Examiner*—Jack Dinh
(74) *Attorney, Agent, or Firm*—Okamoto & Benedicto LLP

(57) ABSTRACT

In one embodiment, a high-density spatial light modulator includes a substrate having a reflective surface and a reflective ribbon over the reflective surface. The ribbon may have one or more openings, such as rectangular slots. The openings allow light to pass through the ribbon and impinge on the reflective surface. Deflecting the ribbon towards the substrate thus allows for dynamically-controllable diffraction of incident light. The spatial light modulator pixel requires less space than a conventional light modulator, thus allowing for relatively large pixel count within a manufacturable device size. Other embodiments are also disclosed.

21 Claims, 4 Drawing Sheets

OTHER PUBLICATIONS

R.W. Corrigan, et al. "Calibration of a Scanned Linear Grating Light Valve Projection System" May 18, 1999, pp. 1-4, Silicon Light Machines. Presented at Society for Information Display Symposium, San Jose, CA.

Robert Corrigan, et al. Silicon Light Machines—Grating Light Valve Technology Brief, Jun. 2001 ver C, pp. 1-8; Sunnyvale, California.

* cited by examiner

HIGH-DENSITY SPATIAL LIGHT MODULATOR

CROSS-REFERENCE TO RELATED APPLICATIONS

The present application claims the benefit of U.S. provisional application No. 60/506,624, entitled "Spatial light modulator," filed Sep. 26, 2003, by inventors Jahja I. Trisnadi and Clinton B. Carlisle. The disclosure of the aforementioned U.S. provisional application is hereby incorporated by reference in its entirety.

BACKGROUND OF THE INVENTION

1. Field of the Invention

The present invention relates generally to light modulators, and more particularly but not exclusively to micro electromechanical system (MEMS) based spatial light modulators.

2. Description of the Background Art

Spatial Light modulators fabricated using micro electromechanical system (MEMS) technology, in general, are well known. Examples of such light modulators include the Grating Light Valve™ (GLV™) light modulator available from Silicon Light Machines Corporation of Sunnyvale, Calif. Devices that are of the same type as GLV™ light modulators are hereinafter referred to as "ribbon light modulators". Ribbon light modulators are described in the following disclosures, which are integral to this provisional application and can be found in the following patents: U.S. Pat. No. 5,311,360, entitled "Method and Apparatus for Modulating a Light Beam" to Bloom et al.; U.S. Pat. No. 5,841,579, entitled "Flat Diffraction Grating Light Valve" to Bloom et al.; U.S. Pat. No. 5,661,592, "Method of Making and an Apparatus for a Flat Diffraction Grating Light Valve" to Bornstein et al.; and U.S. Pat. No. 6,215,579, entitled "Method and Apparatus for Modulating an Incident Beam for Forming a Two-Dimensional Image" to Bloom et al. The aforementioned four U.S. patents are hereby incorporated by reference. Ribbon light modulators can be employed in various applications including optical networks, video, and printing.

FIGS. 1 and 2 show schematic diagrams of conventional ribbon light modulator structures. In FIG. 1, each ribbon 102 with reflective layer 103 is electro-statically deflectable towards the substrate 104, with reflective layer 106 thereon, to form a diffraction grating with adjustable diffraction strength. In FIG. 2, active deflectable ribbons 202 are interlaced with static un-deflectable ribbons 204 also to form an addressable diffraction grating with adjustable diffraction strength. In FIG. 2, the substrate 208 need not have a reflective surface layer. A ribbon 102 and a gap 108 (ribbon-gap) pair 110 in FIG. 1 or an active ribbon 202 and a static ribbon 204 (ribbon-ribbon) pair 206 in FIG. 2 constitutes a diffraction period. One or more periods can be addressed as a "pixel." A pixel can be addressed to modulate incident light by diffraction. Thus, a pixel can be used to display or print a unit of an image, for example.

While conventional spatial light modulators can be satisfactorily used in a wide variety of high resolution applications, there are emerging applications that may require even higher pixel resolution. Examples of these emerging applications include super high resolution display, maskless lithography, high resolution printing for printed circuit boards and flat panel displays, and a host of other applications. There are also existing applications, such as laser printers, that can be considerably improved by the use of high resolution spatial light modulators.

SUMMARY

In one embodiment, a high-density spatial light modulator includes a substrate having a reflective surface and a reflective ribbon over the reflective surface. The ribbon may have one or more openings, such as rectangular slots. The openings allow light to pass through the ribbon and impinge on the reflective surface. Deflecting the ribbon towards the substrate thus allows for dynamically-controllable diffraction of incident light. The spatial light modulator pixel requires less space than a conventional light modulator, thus allowing for relatively large pixel count.

These and other features of the present invention will be readily apparent to persons of ordinary skill in the art upon reading the entirety of this disclosure, which includes the accompanying drawings and claims.

The use of the same reference label in different drawings indicates the same or like components. Drawings are not necessarily to scale unless otherwise noted.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

The present invention relates to a diffractive, spatial light modulator. While embodiments of the invention are described using linear ribbon light modulators as examples, it should be understood that the invention is not so limited and may also be employed in other types of spatial light modulators.

Figure 1:
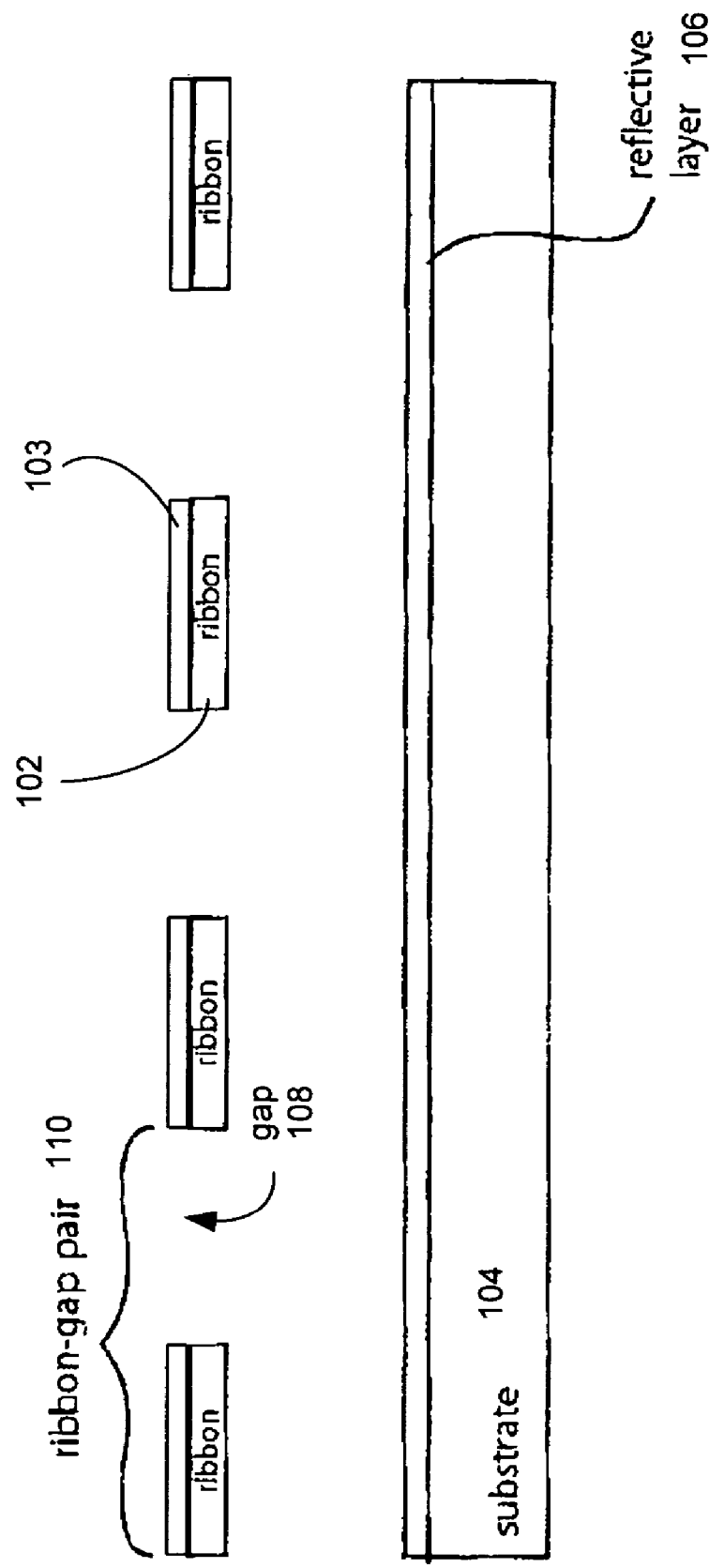
FIG. 1 schematically shows a conventional ribbon light modulator structure.
Figure 2:
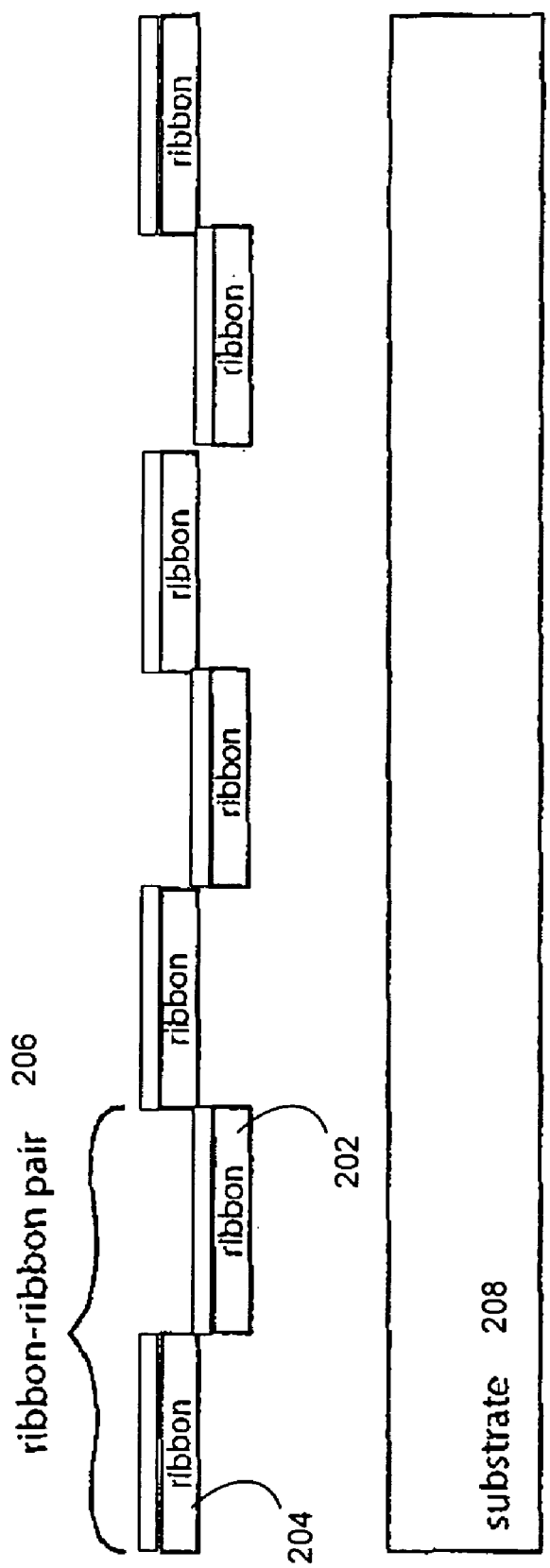
FIG. 2 schematically shows another conventional ribbon light modulator structure.
Figure 3:
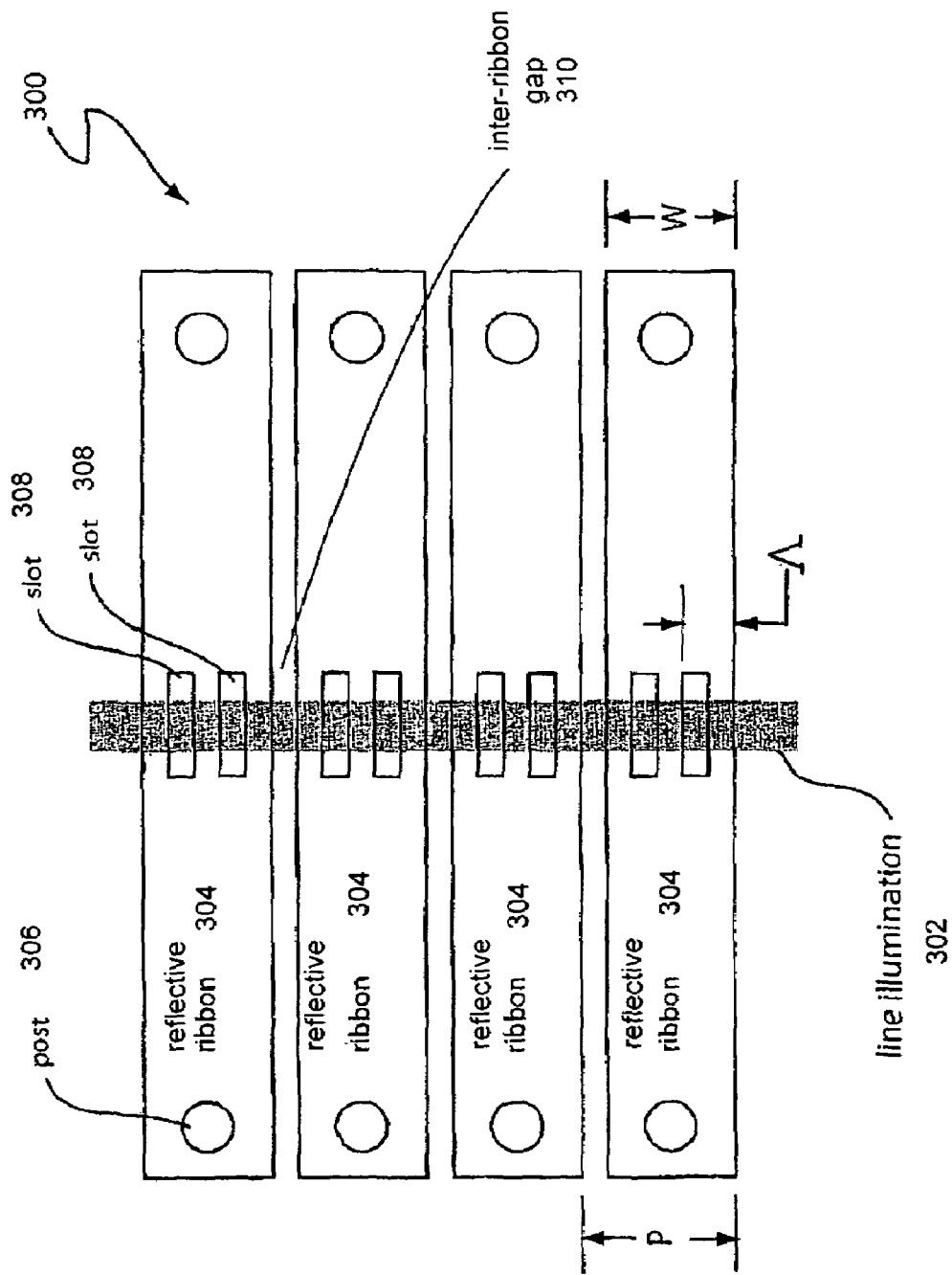
FIG. 3 schematically shows a top view of a high-density ribbon light modulator in accordance with an embodiment of the present invention.
Figure 4:
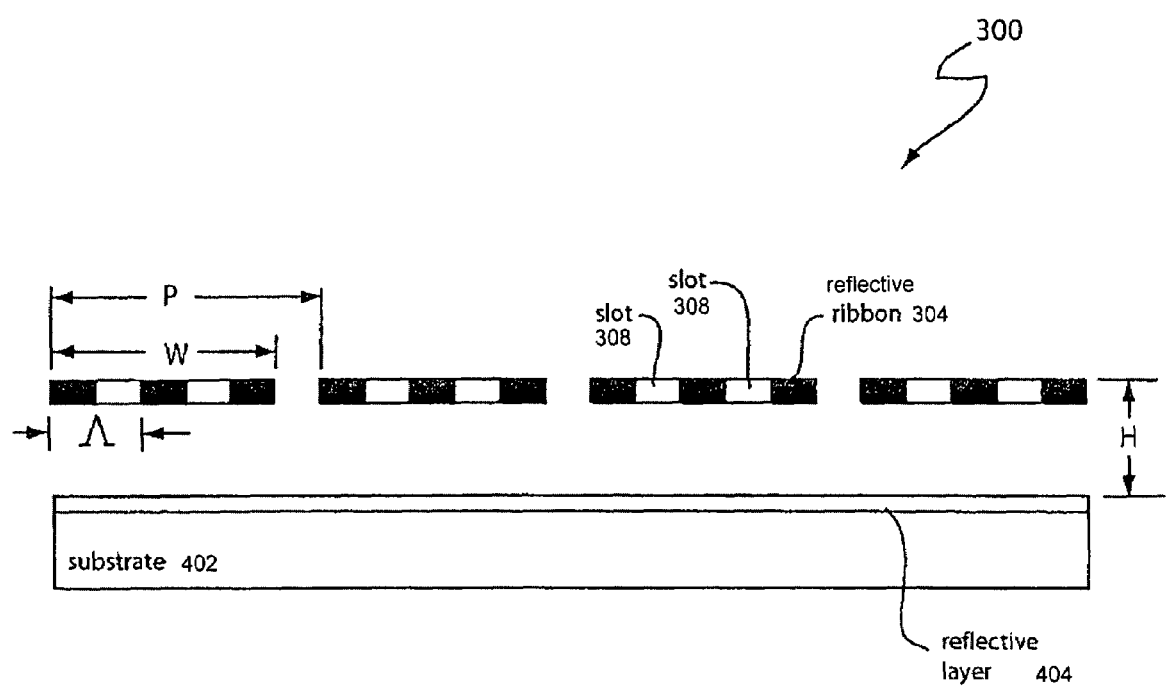
FIG. 4 schematically shows a center cross-section of the ribbon light modulator of FIG. 3.

FIGS. 3 and 4 show schematic diagrams of a high-density or high pixel count linear, diffractive, spatial ribbon light modulator 300 in accordance with an embodiment of the present invention. FIG. 3 shows a top view of an embodiment of the light modulator 300, while FIG. 4 shows a cross-sectional view of the embodiment of the light modulator 300 as seen by cutting through the line illumination 302 denoted in FIG. 3. Light modulator 300 may have from a few to many thousands, or more, reflective ribbons, but only four ribbons 304 are shown for clarity of illustration. The ends of each ribbon 304 may be anchored using posts 306 or other means. The ribbons 304 and the substrate beneath them preferably have reflective top surfaces and are separated by an air gap. In the example of FIG. 4, the top surface of the substrate 402 is shown as having an overlying reflective layer 404. Each ribbon 304 preferably also has such a reflective layer on its top surface (as illustrated in FIGS. 1 and 2). Each ribbon has one or more openings in the form of rectangular slots 308. The slots 308 allow portions of light illuminating the shaded region labeled "line illumination" to impinge on the reflective layer 404 of the substrate 402 underneath the ribbons 304. In a preferred embodiment, the spatial light modulator 300 is configured such that a) the area-reflectivity product due to the reflective layer on the ribbons, and b) the area-reflectivity product due to the openings within and between the ribbons, are approximately equal. Light modulator 300 may be fabricated using a MEMS process technology similar to those employed in the fabrication of conventional ribbon light modulators.

The middle portions (in between the anchored portions) of the reflective ribbons 304 may be deflected towards the substrate by electrostatic force, for example. Deflecting the ribbons 304 varies the distance between the top surfaces of the ribbons 304 and the reflective layer 404 of the substrate 402, thereby varying the path length difference of light impinging on them. This allows incident light to be modulated by diffraction.

In light modulator 300, a diffraction period "$\Lambda$" comprises a strip of ribbon surface and an opening. An addressable pixel "P" has "N" periods/pixel (i.e., P=N$\Lambda$). In the example of FIGS. 3 and 4, each pixel has three periods. Note that the gaps 310 between ribbons have the same effect as the slots 308. The ribbon width "W" is thus given by the equation W=P−($\Lambda$/2). Light modulator 300 may be operated in zero-order or first-order mode. In zero-order mode, the $0^{th}$ order components of the light are collected and modulation is obtained by diffracting the light away into first and higher orders. In the first-order mode, it is the modulated $1^{st}$ order components of the light that are collected. However, since the period of light modulator 300 may be just a few wavelengths, the diffraction angle may get very large. Therefore, it is preferable to operate light modulator 300 in the zero-order mode.

The distance "H" is the distance between the top reflective surfaces of the ribbons and the reflective layer of substrate. If H=(odd integer)($\lambda$/4), where "$\lambda$" is the wavelength of the incident light, then the light modulator 300 is normally OFF. In other words, the un-deflected state is diffracting so light is discarded, corresponding to a dark pixel in the zero-order mode. If H=(even integer)($\lambda$/4), then the light modulator 300 is normally ON. That is, the un-deflected state is specular, which corresponds to a bright pixel in the zero-order mode. Because a ribbon may snap down if the deflection exceeds H/3, the smallest even and odd integer multipliers are preferably four and five, respectively. A height margin $\delta$ may be added to the distance H to allow for uniformity calibration. In other words, a light modulator 300 that is normally OFF may be configured with H=M($\lambda$/4)+$\delta$, where M is an odd integer no less than five (i.e., M=5, or 7, or 9, or 11 etc.), while a light modulator 300 that is normally ON may be configured with H=M($\lambda$/4)+$\delta$, where M is an even integer no less than four (i.e., M=4, or 6, or 6, or 10 etc.).

As a specific example, $\Lambda$=1 micrometer ($\mu$m) and N=3 periods/pixel result in P=3 $\mu$m (i.e., 1 $\mu$m×3). The slot width as well as the gap between ribbons are each equal to ($\Lambda$/2) or 0.5 $\mu$m (i.e., 1 $\mu$m/2). The ribbon width W is 2.5 $\mu$m (i.e., 3 $\mu$m−(1 $\mu$m/2)). For a light source having a wavelength $\lambda$=0.5 $\mu$m, a normally OFF light modulator may have a distance H of 0.625 $\mu$m (odd integer=5) or 0.875 $\mu$m (odd integer=7). For ten thousand (10,000) pixels, the die will be only about 30 mm (10,000×3 $\mu$m) long.

For ribbon structures that are ~$\lambda$, full vector diffraction analysis may be employed to optimize the device operation and account for polarization effects in the light field interaction with the structure. Also, the drive electronics for each pixel may be integrated in the same silicon as the ribbon structure to allow for very high pixel count and fine pixel pitch.

A large pixel count, diffractive, spatial light modulator has been disclosed. The modulator may configured as a linear array, or alternatively, as a two-dimensional array. While specific embodiments have been provided, it is to be understood that these embodiments are for illustration purposes and not limiting. Many additional embodiments will be apparent to persons of ordinary skill in the art reading this disclosure.

What is claimed is:

1. A MEMS spatial light modulator comprising:
   a substrate having a reflective surface; and
   a ribbon, having end supports but no side supports, configured over the reflective surface of the substrate, the ribbon comprising an elongated flat member with a reflective surface, the member spanning a length over a cavity of the substrate and having one or more openings in a middle portion, the opening(s) allowing light to pass through and impinge on the reflective surface of the substrate,
   wherein the ribbon is deflectable towards the substrate to diffract incident light in a controllable manner.

2. The light modulator of claim 1, wherein the ribbon is deflectable using electrostatic force.

3. The light modulator of claim 1, wherein the light modulator is configured to controllably deflect the ribbon by approximately one quarter wavelength of the light.

4. The light modulator of claim 1, further comprising a second ribbon that is deflectable towards the reflective surface of the substrate.

5. The light modulator of claim 4, wherein a gap between the two ribbons has a same distance as a width of an opening in the ribbon.

6. The light modulator of claim 1, wherein each opening comprises a slot.

7. The light modulator of claim 6, wherein the slot is substantially rectangular in shape.

8. The light modulator of claim 1, wherein a width of each opening is equal to a distance between two adjacent openings.

9. The light modulator of claim 1, wherein a single ribbon is controlled so as to represent a single pixel.

10. The light modulator of claim 1, wherein an undeflected height of the ribbon is approximately equal to one fourth a wavelength of the light multiplied by an integer.

11. The light modulator of claim 10, wherein the integer is at least a minimum number to avoid a snap down condition of the ribbon when the ribbon is deflected.

12. The light modulator of claim 11, wherein the minimum number is four.

13. The light modulator of claim 10, wherein the integer is odd, and wherein the light is diffracted when the ribbon is undeflected.

14. The light modulator of claim 10, wherein the integer is even, and wherein the light is specularly reflected when the ribbon is undeflected.

15. A high-density spatial light modulator comprising:
   a substrate;
   an array of deflectable ribbon devices, having end supports but not side supports, configured above the substrate and spanning a length across a cavity on the substrate;
   one or more openings within each ribbon device;

an opening between adjacent ribbon devices;
a reflective layer on each ribbon device,
a reflective layer on the substrate configured at least beneath said openings; and
wherein the spatial light modulator is configured such that area-reflectivity products of a) the reflective layer on the ribbons and b) the openings within and between the ribbons to the reflective layer on the substrate, are approximately equal.

16. The spatial light modulator of claim 15, wherein the array comprises a linear array.

17. The spatial light modulator of claim 16, wherein a periodicity of ribbon devices in the linear array is one ribbon device per three micrometers or less.

18. The spatial light modulator of claim 16, wherein the array includes 10,000 ribbon devices or more within a single die, wherein each ribbon device corresponds to a controllable pixel.

19. The spatial light modulator of claim 15, wherein the array comprises a two-dimensional array.

20. A method of spatially modulating light, the method comprising:
impinging light of a wavelength upon an array of ribbon devices, having end supports but no side supports, over a substrate; and
controllably deflecting the ribbon devices,
wherein the substrate comprises a reflective surface, and
wherein each ribbon device comprises a reflective surface and further comprises one or more openings in a middle portion to allow light to pass through to the reflective surface of the substrate.

21. The method of claim 20, wherein at least a single ribbon device corresponds to an individually controllable pixel.

* * * * *